Figure 1:
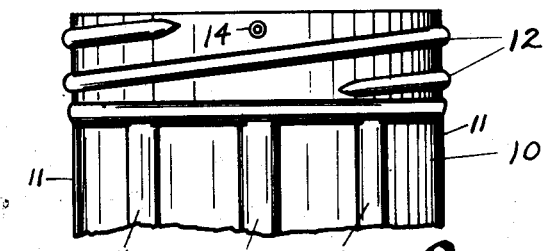

Sept. 16, 1952   J. A. GITS   2,610,755
NURSING UNIT
Filed Oct. 10, 1949

INVENTOR
Joseph A. Gits
BY
Rey Eilers
ATTORNEY

Patented Sept. 16, 1952

2,610,755

UNITED STATES PATENT OFFICE 2,610,755

NURSING UNIT

Joseph A. Gits, Chicago, Ill., assignor of one-half to Jules P. Gits, Chicago, Ill.

Application October 10, 1949, Serial No. 120,528

9 Claims. (Cl. 215—11)

This invention relates to improvements in nursing units. More particularly, this invention relates to an improved nursing unit which can provide a ready flow of fluid during nursing periods but which can be fluid-tight at all other times.

It is therefore an object of the present invention to provide an improved nursing unit which can provide a ready flow of fluid during nursing periods but which can be fluid-tight at all other times.

Nursing units customarily consist of receptacles, nipples, and retainers; the retainers holding the bases of the nipples in sealing engagement with the open ends of the receptacles. Each of the nipples contains at least one opening for withdrawal of fluid; and each of the nipples usually contains, or coacts with a notch in the end of the receptacle to define, an opening for inlet of air. The opening for inlet of air is usually quite small to prevent the escape of liquid therethrough during nursing, and yet it must be large enough to admit sufficient air to the receptacle to equalize the pressures inside and outside the receptacle. When a nipple is new, the rubber therein is "live"; and the opening for inlet of air performs its intended function satisfactorily. However, when the nipple has been used steadily for appreciable periods of time, the rubber of the nipple undergoes a pronounced change, and the opening for inlet of air tends to close. Such closing is very objectionable because it leads to the swallowing of considerable quantities of air by the nursing infant. The present invention obviates this objection by forming the opening for inlet of air in the wall of the receptacle rather than in the nipple, and by spacing that opening away from the base of the nipple during nursing periods. The receptacle is made of a material that will not swell or lose resilience during use, and thus the opening for inlet of air will not be constricted or closed because of changes in the material in which it is located. Moreover, because the base of the nipple is spaced away from the opening for inlet of air during nursing periods, no amount of swelling of the rubber in that base can constrict or block that opening. It is therefore an object of the present invention to provide a receptacle with an opening for inlet of air in one wall thereof and to space the base of the nipple away from that opening during nursing periods.

An additional advantage in having the opening in the receptacle spaced from the base of the nipple is that it keeps that base from being squeezed into that opening by the action of the retainer. No matter how tightly the retainer is pressed against the nipple, the base of that nipple cannot restrict or close the opening for inlet of air. This assures a ready flow of fluid for the nursing infant without requiring precise or nice adjustment of the retainer relative to the receptacle.

The opening for inlet of air has a small internal diameter at the inner surface of the receptacle, but it has a large internal diameter at the outer surface of the receptacle; and the inner and outer ends of the opening will be connected by a section of increasing diameter. The small internal diameter at the inner surface of the receptacle enables the opening to coact with the surface tension of the fluid to minimize leakage of that fluid through that opening; and the large internal diameter at the outer surface of the receptacle enables the opening to admit air even when the retainer is telescoped over that opening. The section of increasing diameter between the inner and outer ends of the opening will coact with the large internal diameter at the outer end of the opening to facilitate thorough cleaning of the opening.

The nipple provided by the present invention has an axially-directed wall section that is spaced above and inwardly of the base of the nipple; and that wall section is dimensioned to telescope within the open end of the receptacle when the nipple is directed into the receptacle, as during storage periods. At such time, that wall section will underlie and close the opening for inlet of air which is provided in the wall of the receptacle. A backing element is provided for the nipple, and that element can be telescoped within the wall section of the nipple to hold that wall section firmly against the opening for inlet of air, thus sealing that opening during periods of storage for the nursing unit. It is therefore an object of the present invention to provide a nipple with an axially-directed wall section and a backing element for the nipple that can be telescoped within the wall section of the nipple to hold that wall section firmly against the opening for inlet of air.

The backing element is impervious to air and it spans the open end of the nipple. In doing so, the backing element coacts with the nipple to form an enclosure with only one opening, namely, the opening in the nipple for withdrawal of fluid. Such an enclosure is strongly resistant to entry of fluid; and thus the nursing unit provided by the present invention can be filled, sterilized, stored, or transported without having the fluid pass within the nipple. This is in contrast with prior nipples which had two openings therein; the two openings permitting more ready entry of fluid within the nipple during sterilization, storage or transporting. It is therefore an object of the present invention to provide a backing element that is impervious to air and that spans the open end of the nipple.

The nursing unit receptacle provided by the present invention has a cylindrical interior and has a number of axially-extending ribs on the exterior thereof. The cylindrical interior facilitates complete cleansing and sanitation of the interior of the receptacle, and the ribs on the exterior facilitate firm grasping of that receptacle. This is very desirable because infants have difficulty in holding smooth, cylindrical surfaces but can easily hold the ribbed receptacle. The ribs also facilitate firm grasping of the receptacle even when wet, as after sterilization. It is therefore an object of the present invention to provide a receptacle for nursing units that has a cylindrical interior and has axially-extending ribs on the exterior thereof.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing Fig. 1 is a side elevational view of the upper end of a nursing unit receptacle that is made in accordance with the principles and teachings of the present invention.

Figure 2:
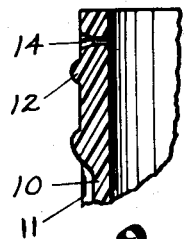
Figure 4:
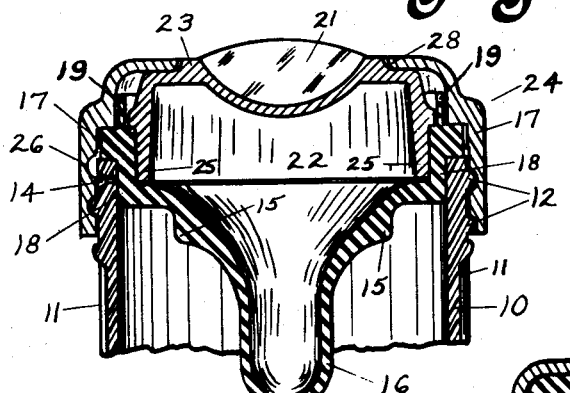
Figure 3:
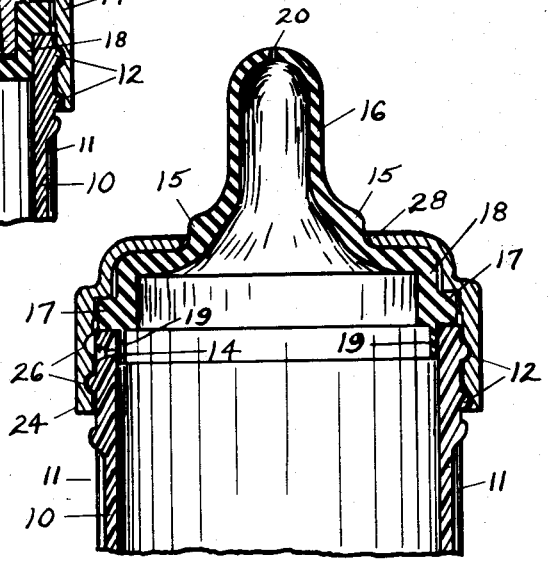
Figure 5:
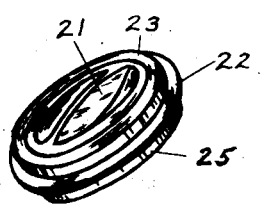

Fig. 2 is a cross sectional view through a portion of the upper end of the receptacle shown in Fig. 1, Fig. 3 is a cross sectional view of the nipple, the retainer, and the upper end of the receptacle provided by the present invention, and it shows the nipple in nursing position, Fig. 4 is a cross sectional view of the nipple, the retainer, the backing element, and the upper end of the receptacle provided by the present invention, and it shows the nipple in position for storing, and Fig. 5 is a perspective view of the backing element shown in Fig. 4.

Referring to the drawing in detail, the numeral 10 denotes a generally cylindrical receptacle that is made of a sturdy material which can be sterilized repeatedly without experiencing swelling or softening. One such material is a plastic known as nylon. When made of nylon, the receptacle 10 will be resistant to breakage, will be light in weight, will reduce heat losses from the fluids placed therein, will be capable of rapid heating or chilling without cracking, and will be capable of being drilled. In all of these respects, a nylon receptacle 10 will be vastly superior to receptacles made of glass. The receptacle 10 has a number of axially-directed ribs 11 on the exterior thereof. These ribs make it possible to decrease the weight of the receptacle 10 without impairment of the strength of, they keep the receptacle from rolling off of a table onto the floor, they enable the nursing infant to hold the receptacle, and they facilitate firm grasping of that receptacle even when wet. The receptacle 10 has a thread 12 at the upper end thereof, and it has an opening 14 through the wall thereof adjacent thread 12. The opening 14 can be drilled or molded as desired; the use of a nylon receptacle 10 facilitating precise drilling of that opening without any danger of cracking or breaking that receptacle.

The opening 14 is for inlet of air; and it has a small internal diameter at the inner surface of the receptacle 10 and it has a large internal diameter at the outer surface of the receptacle 10. The small internal diameter end of opening 14 and the large internal diameter end of opening 14 are connected by a section of increasing diameter. The small internal end of opening 14 coacts with the surface tension of the milk, water or other fluid within the receptacle 10 to minimize leakage of that fluid through the opening 14. The large internal diameter outer end of opening 14, and the section of increasing diameter between the inner and outer ends of opening 14, facilitate ready entry of air into the opening 14 and also facilitate thorough cleaning of that opening. While the opening 14 is adjacent the open end of receptacle 10, it is bodily spaced from that open end. As a result, the open end of the receptacle 10 provides a smooth, continuous uninterrupted seating surface.

The base 17 of a nipple 16 bears against that seating surface; that base having an outer diameter approximately equal to the outer diameter of receptacle 10. An axially-directed wall section 18 is disposed above and inwardly of the base 17, and that wall section is dimensioned so it can telescope snugly within the open end of receptacle 10 when in position for storage, as shown in Fig. 4. When telescoped within the open end of receptacle 10, the axially-directed wall section 18 will underlie and close the opening 14 in the wall of receptacle 10. However, when the nipple 16 is in nursing position, as shown in Fig. 3, the base 17 and the axially-directed wall section 18 will be wholly spaced away from the opening 14. The nipple 16 has an annular skirt 19 depending downwardly from the base 17, and that skirt has an outer diamter which is slightly smaller than the inner diameter of the receptacle 10. As a result, the annular skirt 19 of nipple 16 can telescope within the open end of the receptacle 10 when the base 17 of that nipple abuts that open end in nursing position, as shown in Fig. 3. The annular skirt 19 is long enough so that skirt can underlie the opening 14, and it will coact with the surface tension of the fluid within the receptacle 10 to prevent leakage of fluid out through the opening 14. The annular skirt 19 will not, however, interfere with inlet of air through the opening 14 because that skirt does not form an air tight seal with the upper end of the receptacle 10. The nipple 16 is provided with the usual opening 20 in the projecting end thereof, and that opening is used to withdraw fluid.

As shown and described, the base 17 and the wall section 18 of the nipple 16 are wholly spaced from the opening 14 when that nipple is in nursing position. Moreover, the opening 14 is spaced below the smooth, continuous and uninterrupted surface at the upper end of the receptacle 10 and is protected from contact with the base 17 by that surface. As a result, neither the base 17 nor the wall section 18 can be pressed into or against opening 14 to restrict or close that opening when the nipple 16 is in nursing position. The depending annular skirt 19 will underlie the opening 14, but that skirt will have a smaller diameter than that of receptacle 10, and it will be thin enough to be very flexible. Consequently, even a very small difference of pressure between the atmospheres inside and outside the receptacle 10 will bend that skirt away from opening 14. For these various reasons, the receptacle 10 and the nipple 16 assure a steady flow of fluid during nursing periods.

The nipple 16 will be made of high quality rubber, and it will flex during nursing periods to permit withdrawal of fluid through opening 20. The constant flexing of the nipple 16 will "knead" the rubber around opening 20 and will keep that rubber "live." As a result, the rubber around the opening 20 will not quickly swell or soften, and the opening 20 will remain open indefinitely. The rubber in the rest of the nipple 16 will not be "kneaded" extensively, and it would tend to constrict or obstruct air-inlet openings therein; but any such constriction or obstruction of air-inlet openings, and the attendant discomfort to the nursing infant, is wholly avoided by locating the opening for inlet of air in receptacle 10 rather than in nipple 16.

The numeral 22 denotes a backing element which has a generally cylindrical body portion 25 that can be telescoped within the open end of the nipple 16. This body portion 25 is dimensioned so it underlies and supports the axially-directed wall section 18 of nipple 16, and so it can hold that axially-directed wall section in sealing engagement with the opening 14 when the nipple is in storing position, as shown in Fig. 4.

The backing element 22 is impervious and it spans the open end of the nipple 16; thus it coacts with the nipple 16 to provide an enclosure with only one opening, namely, the opening 20. It would be exceedingly difficult for fluids to pass into that enclosure through opening 20 because that enclosure acts as a closed air-space; and the air therein will resist ingress of fluids. This is a definite improvement over prior nipples which had two or more openings, because fluid could enter through one opening while air passed out through another opening.

The numeral 24 denotes a retainer which has a thread 26 on the interior thereof. That thread is dimensioned to releasably engage the thread 12 on the upper, open end of receptacle 10; and the threads 26 and 12 are loose enough, as shown in Figs. 3 and 4, to permit air to pass along those threads and into the opening 14. The retainer 24 has a circular opening 28 at the center thereof, and that opening selectively surrounds and engages the shoulder 23 on the backing element 22 or the shoulder 15 on nipple 16. The retainer thus positively centers the backing element 22 or the nipple 16 relative to the receptacle 10.

A positive seal is effected between the nipple 16 and the smooth, continuous, uninterrupted surface at the upper end of the receptacle 10 when the nipple 16 is in nursing position; the base 17 of nipple 16 being held securely against the said surface by retainer 24. A positive seal is also effected between the backing element 22, nipple 16, and receptacle 10 when the nipple 16 is in position for storing; the body portion 25 of backing element 22 forcing the wall section 18 of nipple 16 against opening 14, and the base 17 of nipple 16 acting as a fluid-tight gasket between backing element 22 and receptacle 10. With this arrangement, an absolutely fluid-tight seal is provided between the nipple 16 and receptacle 10 in both nursing and storing positions.

Nursing units made in accordance with the principles and teachings of the present invention can be sterilized and filled with fluid, the nipples 16 can be interfitted with the backing elements 22, the backing elements and nipples can be lifted by means of the tabs 21 on the backing elements 22, the nipples can be inserted within the receptacles, as shown in Fig. 4, and thereafter the retainers 24 can be threaded onto the receptacles 10 to hold all of the various elements in assembled relation. Assembled in this manner, the nursing units can be stored or transported with but little likelihood of fluid passing through openings 20 and lodging within nipples 16; and this, even though the nursing units are jostled considerably in transport. When the nursing units are to be used, the retainers 24 are removed, the tabs 21 of backing elements 22 are grasped and used to insert the nipples within the retainers as shown in Fig. 3, the backing plates 22 are pulled away from the nipples 16, and then the retainers are threaded onto the receptacles. When the nipples are in position for storing their wall sections 18 positively close openings 14, and when the nipples are in nursing position their wall sections 18 are wholly spaced away from those openings. Thus the nursing units are proof against ingress of contaminants and against egress of fluid when in storing position, and are able to provide a ready flow of fluid when in nursing position.

Whereas a preferred embodiment of the present invention has been shown and described in the drawing and accompanying description it should be obvious to those skilled in the art that various changes may be made in the form of the invention without affecting the scope thereof.

What I claim is:

1. In a nursing unit that comprises a receptacle, a nipple, and a retainer, the improvement which comprises an opening for inlet of air in a wall of the receptacle, said opening being spaced a short distance away from the open end of said receptacle, an axially-directed wall section on said nipple, said wall section being dimensioned to telescope within said open end of said receptacle and to underlie and close said opening for inlet of air whenever said nipple is in position for storage, said wall section being wholly spaced away from said opening for inlet of air whenever said nipple is in nursing position, said nipple having a downwardly depending skirt thereon that overlies and selectively closes said opening in said receptacle and that selectively seals said opening to resist flow of fluid outwardly through said opening, and a backing element, said backing element being impervious and spanning the open end of said nipple whereby said backing element and said nipple coact to form an enclosure with just one opening therein, said backing element having a generally cylindrical body portion dimensioned to telescope within the axially-directed wall section of said nipple to press said wall section into sealing engagement with said opening for inlet of air.

2. In a nursing unit that comprises a receptacle, a nipple, and a retainer, the improvement which comprises an opening for inlet of air in a wall of the receptacle, said opening being spaced away from the open end of said receptacle, an axially-directed wall section on said nipple, said wall section being dimensioned to telescope within said open end of said receptacle and to underlie and close said opening for inlet of air whenever said nipple is in position for storage, said wall section being wholly spaced away from said opening for inlet of air whenever said nipple is in nursing position, and a backing element, said backing element having a generally cylindrical body portion dimensioned to telescope within the axially-directed wall section of said nipple and to telescope within said open end of said receptacle and press said wall section into sealing engagement with said opening for inlet of air.

3. In a nursing unit that comprises a receptacle, a nipple, and a retainer, the improvement which comprises an opening for inlet of air in a wall of the receptacle, said opening being spaced away from the open end of said receptacle, an axially-directed wall section on said nipple, said wall section being dimensioned to telescope within said open end of said receptacle and to underlie and close said opening for inlet of air whenever said nipple is in position for storage, and a backing element dimensioned to telescope within the axially-directed wall section of said nipple and to telescope within said open end of said receptacle and press said wall section into sealing engagement with said opening for inlet of air.

4. In a nursing unit that comprises a receptacle, a nipple, and a retainer, the improvement which comprises an opening for inlet of air in a wall of the receptacle, said opening being spaced away from the open end of said receptacle, a wall section, said wall section on said nipple being dimensioned to telescope within said open end of said receptacle and to underlie and close said opening for inlet of air whenever said nipple is in position for storage, said wall section being wholly spaced away from said opening for inlet of air whenever said nipple is in nursing position, and a backing element, said backing element being dimensioned to telescope within the axially-directed wall section of said nipple and to telescope within said open end of said receptacle and press said wall section into sealing engagement with said opening for inlet of air.

5. In a nursing unit that comprises a receptacle, a nipple, and a retainer, the improvement which comprises an opening for inlet of air in a wall of the receptacle, said opening being spaced away from the open end of said receptacle, and a wall section on said nipple, said wall section being dimensioned to telescope within said open end of said receptacle to underlie and close said opening for inlet of air whenever said nipple is in position for storage, said wall section being wholly spaced away from said opening for inlet of air whenever said nipple is in nursing position, said nipple having a downwardly depending skirt thereon that overlies and selectively closes said opening in said receptacle and that selectively seals said opening to resist flow of fluid outwardly through said opening.

6. In a nursing unit that comprises a receptacle, a nipple, and a retainer, the improvement which comprises an opening for inlet of air in a wall of the receptacle, said opening being spaced away from the open end of said receptacle, a wall section on said nipple, said wall section being dimensioned to telescope within said open end of said receptacle and to underlie and close said opening for inlet of air whenever said nipple is in position for storage said wall section being wholly spaced away from said opening for inlet of air whenever said nipple is in nursing position, said nipple having a downwardly depending skirt thereon that overlies and selectively closes said opening in said receptacle and that selectively seals said opening to resist flow of fluid outwardly through said opening, and a backing element for said nipple.

7. In a nursing unit that comprises a receptacle, a nipple, and a retainer, the improvement which comprises an opening for inlet of air in a wall of the receptacle, said opening being spaced away from the open end of said receptacle, said nipple having an opening therethrough for flow of fluid, said nipple being dimensioned to telescope within said open end of said receptacle and to underlie and close said opening for inlet of air whenever said nipple is in position for storage, said nipple being wholly spaced away from said opening for inlet of air whenever said nipple is in nursing position, said nipple having a downwardly depending skirt thereon that overlies and selectively closes said opening in said receptacle and that selectively seals said opening to resist flow of fluid outwardly through said opening, and a backing element for said nipple, said backing element being impervious and spanning the open end of said nipple whereby said backing element and said nipple coact to form an enclosure with just the said one opening in said nipple therein.

8. In a nursing unit that comprises a receptacle, a nipple, and a retainer, the improvement which comprises an opening for inlet of air in a wall of the receptacle, said opening being spaced away from the open end of said receptacle, said nipple being dimensioned to telescope within said open end of said receptacle and to underlie and close said opening for inlet of air whenever said nipple is in position for storage, said nipple having a depending skirt thereon that overlies and selectively closes said opening for inlet of air and that can telescope within said receptacle and can coact with the surface tension of the fluid in said receptacle to resist flow of fluid outwardly through said opening, said skirt being dimensioned to have an outer diameter that is less than the inner diameter of said receptacle.

9. In a nursing unit that comprises a receptacle, a nipple, and a retainer, the improvement which comprises an opening for inlet of air in a wall of the receptacle, said opening being spaced a short distance away from the open end of said receptacle, said nipple being dimensioned to telescope within said open end of said receptacle and to underlie and close said opening for inlet of air whenever said nipple is in position for storage, said nipple having a downwardly depending skirt thereon that overlies and selectively closes said opening in said receptacle and that selectively seals said opening to resist flow of fluid outwardly through said opening.

JOSEPH A. GITS.

REFERENCES CITED

The following references are of record in the file of this patent:

UNITED STATES PATENTS

| Number | Name | Date |
| --- | --- | --- |
| 1,564,759 | Creque | Dec. 8, 1925 |
| 1,702,233 | Frye | Feb. 12, 1929 |
| 1,998,646 | Yager | Apr. 23, 1935 |
| 2,056,124 | Pierson et al. | Sept. 29, 1936 |
| 2,093,130 | Kurkjian | Sept. 14, 1937 |
| 2,219,576 | Moreland | Oct. 29, 1940 |
| 2,471,172 | Stoller | May 24, 1949 |